United States Patent
Cutter

[11] Patent Number: 5,918,523
[45] Date of Patent: Jul. 6, 1999

[54] SYSTEM FOR GUIDING CUTTING TOOL

[76] Inventor: Jack Cutter, 4785 Terra Granada Dr., #3A, Walnut Creek, Calif. 94595

[21] Appl. No.: 09/054,748

[22] Filed: Apr. 3, 1998

[51] Int. Cl.[6] .............................. B26D 7/00; B23K 26/14; B27C 5/00
[52] U.S. Cl. .................................. 83/520; 83/861; 83/875; 144/137; 144/144.1; 144/364; 144/2.1; 144/135.2; 144/136.1; 216/54; 219/121.67; 409/85; 409/182
[58] Field of Search .................................. 409/85, 86, 125, 409/130; 144/2.1, 137, 144.1, 364, 380, 136.1, 135.2; 219/121.67, 121.69, 87, 121.68; 83/520, 521, 522, 861, 875, 170; 216/54

[56] References Cited

U.S. PATENT DOCUMENTS 4,885,967 12/1989 Bell et al. .
5,038,481 8/1991 Smith .
5,285,708 2/1994 Bosten et al. .
5,446,635 8/1995 Jehn .
5,461,790 10/1995 Olstowski .

*Primary Examiner*—W. Donald Bray
*Attorney, Agent, or Firm*—Theodore J. Bielen, Jr.

[57] ABSTRACT

A system for guiding a cutting tool utilizing a beam generator and a platten having a surface which is capable of presenting a pattern. The beam impinging on the platten is discernable. The beam generator is aligned with the cutting portion of the cutting tool such that the beam on the surface of the platten represents the position of the part of the cutting tool relative to a work piece. An operator may cut a pattern in the work piece by following the pattern on the platten with the beam image on the platten.

12 Claims, 2 Drawing Sheets

SYSTEM FOR GUIDING CUTTING TOOL

BACKGROUND OF THE INVENTION

The present invention relates to a novel and useful system for guiding a cutting tool having a cutting part.

The cutting of a design into a work piece has been accomplished in the past by first tracing the rendition of the pattern on the work piece and then following the tracing with the cutting tool. Although successful in producing a finished item, such a process is tedious, in certain cases inaccurate. The latter results from discrepancies inherent in the transfer of a design from a separate drawing or sketch to the work piece. In the past, special tracing papers have been used to achieve this result.

Other systems have been proposed to aid cutting tools in tracing or following a particular design. For example, U.S. Pat. Nos. 5,038,481, 5,285,708, and 5,461,790 show projected lighting devices attached to the tool which aid persons in sawing wood and other materials.

U.S. Pat. Nos. 4,885,967 and 5,446,635 describe laser alignment devices that permit cutting of work pieces along a projected laser beam which proceeds the moving cutting tool or work piece.

A system for guiding a cutting tool which permits the user to cut a design quickly, efficiently, and accurately would be a notable advance in the manufacturing arts.

SUMMARY OF THE INVENTION

In accordance with the present invention a novel and useful system for guiding a cutting tool removing portions of a work piece is herein provided.

The system of the present invention utilizes means for generating a beam of electromagnetic radiation. Such beam may be in the form of visible light, coherent light generated by a laser, or any electromagnetic beam which is detectable in some manner. The means for generating the beam may be self contained and easily movable for use in many situations.

A platten is also included in the present invention. The platten possesses a surface which is capable of presenting a pattern. Such pattern may take the form of something which is drawn on the surface of the platten or a design which is applied to the surface of the platten and the like. The beam from said beam generator impinges on the platten surface and is discernable thereupon. In certain cases the platten may be partially composed of a translucent material such that the surface upon which the laser beam impinges is opposite to another surface through which beam initially passes.

Alignment means is also found in the present invention for positioning the beam relative to a cutting part of a cutting tool which is employed to affect removal of material from the work piece. Following the pattern of the discernable beam guides the cutting tool in such removal process. In this regard, the beam generator may be attached directly to the cutting tool and be located beneath the platten such that the beam is projected through the translucent platten to the surface for viewing. In such case, means would also be found for mounting the beam generator to the axis of the cutting part of the tool where a tool does possess a cutting part or bit that possesses an axis. For example, the bit of a router or drill would fulfill this parameter of use. On the other hand, the beam generator may be mounted relative to the platten and connected work piece, in alignment with the cutting part of the cutting tool such that the work piece, rather than the cutting tool is moved according to the coinciding of the image of the beam with the pattern on the platten.

It may be apparent that a novel and useful system for guiding a cutting tool is herein provided.

It is therefore and object of the present invention to provide a system for guiding a cutting tool which permits the user to easily trace a pattern on a work piece without transferring such pattern to the work piece.

It is another object of the present invention to accurately and efficiently cut a pattern in a work piece utilizing a beam generator which may be axially aligned with the cutting bit of the cutting tool.

Another object of the present invention is to provide a system for guiding a cutting tool to produce a pattern on a work piece which is usable either by moving the cutting tool relative to a stationary work piece or moving the work piece relative to a stationary cutting tool.

A further object of the present invention is to provide a system for guiding a cutting tool which is capable of removing portions of a work piece that is portable and adaptable to existing cutting tools by retrofitting.

The invention possesses other objects and advantages especially as concerns particular characteristics and features thereof which will become apparent as the specification continues.

For a better understanding of the invention references made to the following detailed description of the preferred embodiments thereof which should be taken in conjunction with the prior described drawings.

DETAILED DESCRIPTION OF THE PREFERRED EMBODIMENTS

Various aspects of the present invention will evolve from the following detailed description of the preferred embodiments thereof which should be referenced to the hereinbefore described drawings.

Figure 1:
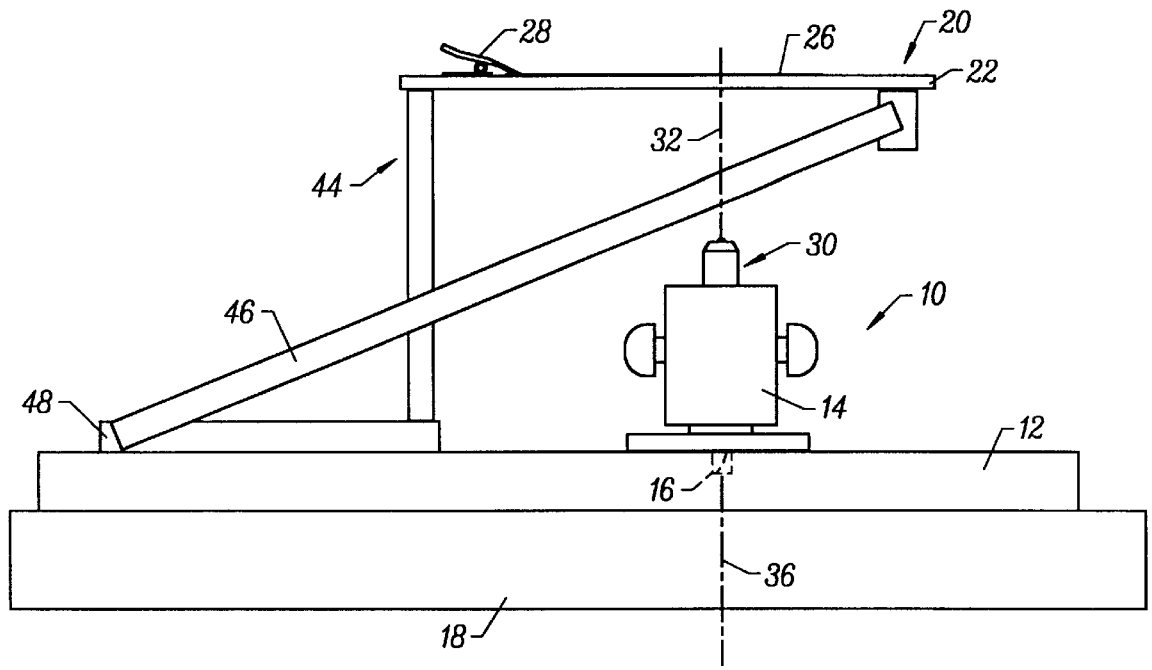
FIG. 1 is a side elevational view of a first embodiment of the present invention.
Figure 2:
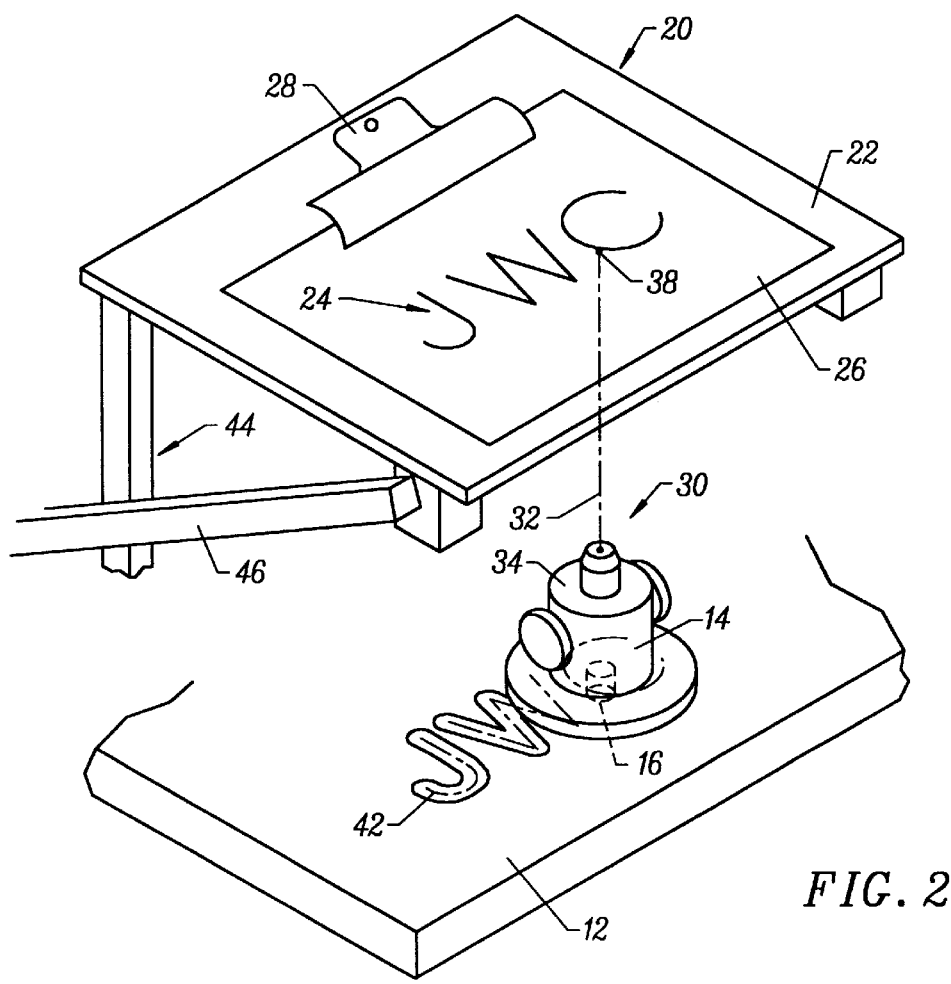
FIG. 2 is a top right perspective view of the first embodiment of the system of the present invention in use as depicted in FIG. 1.

The invention as a whole is depicted in the drawings by reference character 10. System 10 is employed in conjunction with a work piece 12, such as a piece of wood, plastic, and the like, which is cut by a cutting tool 14. As shown in FIGS. 1 and 2, cutting tool 14 takes the form of a router, such as a De Walt model 621, 2HP. However, any suitable router or other cutting tool may be used as cutting tool 14. Cutting tool 14 includes a cutting part or bit 16 which rotates and cuts into work piece 12 at a certain depth. Cutting tool 14 is manually operated by a user in the present case. It should be noted that work piece 12 also is depicted as being supported by a base member 18 such as a table, floor, and the like.

Platten 20 also constitutes part of system 10 of the present invention. Platten 20 may be constructed in two parts and include an base portion 22 which is capable of presenting or holding a pattern such as pattern 24 on translucent paper sheet 26. Platten base 22 may be wholly or partially transparent in the embodiment 10 shown in FIGS. 1 and 2. Pattern 24 drawn on a translucent paper sheet 26 is held to platten base 22 by clip 28.

Means 30 generates a beam of electromagnetic radiation such as beam 32. Normally such beam 32 travels in a straight line and is rather narrow in width. For example, means 30 may take the form of a laser beam generator. Laser beam generator 30 is fixed to the top surface 34 of cutting tool 14 and is aligned with the axis 36 of cutting bit 16. Beam 32 is capable of traveling through platten base 22 and translucent sheet 26 to forming an image 38 on surface 22 thereof. Image 38 appears as a small dot 38. Dot 38 has been enlarged in FIG. 2 for the sake of emphasis. In actuality, dot 38 would exist at the same narrow width as beam 32 from generator 30. Thus, the positioning of beam generator 30 on surface 34 of cutting tool 14 with beam 32 coincident with axis 36 would serve as alignment means 40. Alignment means 40 positions beam 32, shown in FIGS. 1 and 2, to permit removal of material from work piece 12 by cutting tool 14. Such removal is depicted as a cut design 42 in FIG. 2.

Support legs 44 (one shown on FIGS. 1 and 2) and brace 46 connect to a plate 48 which is fixed to work piece 24. It should be noted that plate 48 may also be fixed to base 18 in certain cases. Support legs 44 and brace 46 support platten 20 at a convenience height above work piece 12 and cutting tool 14 during operation of system 10.

Figure 3:
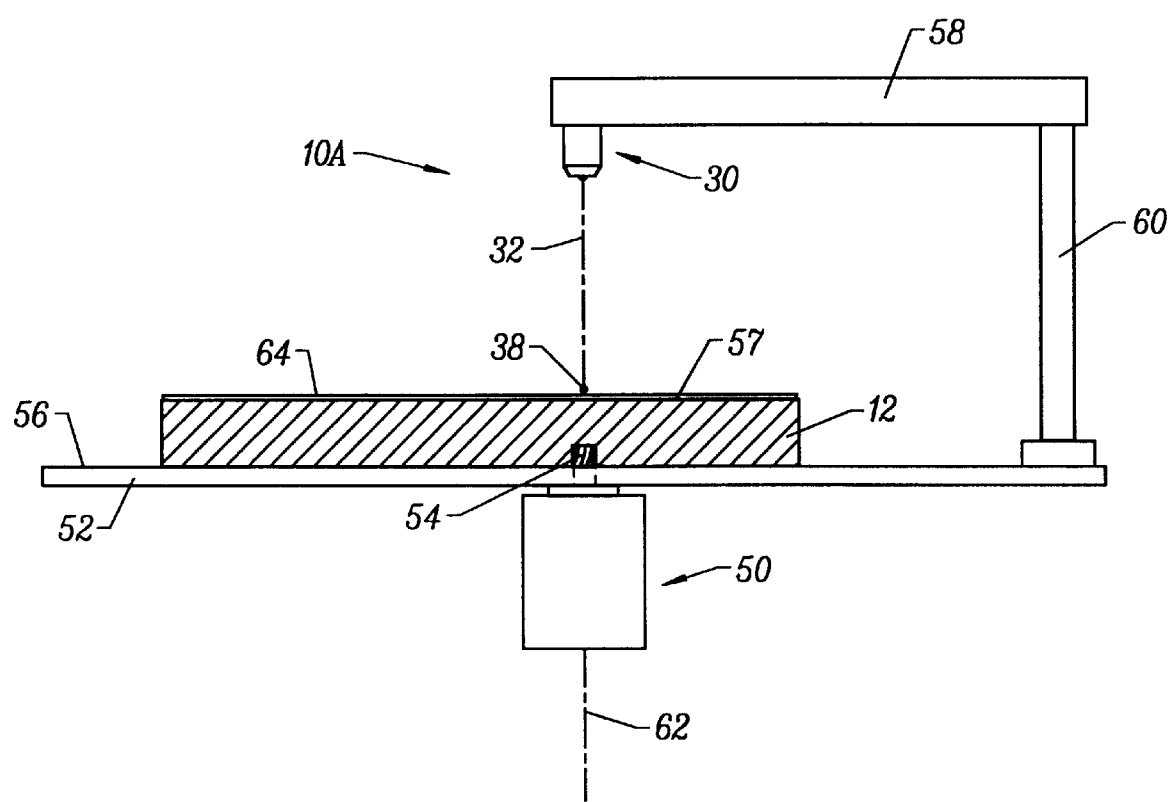
FIG. 3 is a side elevational view, with the work piece in section, showing a second embodiment of the present invention.

Turning to FIG. 3, it may be observed that an alternate embodiment 10A of the present system is shown. In such a case, cutting tool 50 is mounted beneath a work surface 52 permitting cutting bit 54 to extend upwardly above upper surface 56 of working surface 52. This arrangement of FIG. 3 is commonly known as a router table. Work piece 12 lies on surface 56 with paper platten 57 that is not necessarily translucent. In fact, paper platten 57 may be opaque. Thus, the transparent portion 22 of platten 20 of FIGS. 1 and 2, has been omitted in embodiment 10A. Beam generating means 30 is mounted on an arm 58 that is supported by a pole 60 to work table or work surface 52. Beam 32 is aligned, again, with the axis 62 of cutting part or bit 54 of cutting tool 50. Thus, image 38, in the form of a dot, would appear on the upper surface 64 of platten 57.

In operation, with the embodiment shown in FIGS. 1 and 2, the operator activates the beam generator 30 to direct a beam 32 through the transparent portion 22 of platten 20. Image 38 appears on the translucent paper portion 26 of platten 20. Paper portion 26 of platten 20 is provided with a design 24. Work piece 12 is positioned below platten 20 and the operator views dot or image 38 and moves router or cutting tool 14 according to the coincidence of dot 38 with platten pattern 24. Cut design 42 results from this process.

With respect to the embodiment 10A shown in FIG. 3, the operator activates cutting bit 54 and beam generator 30. Work piece 12 is then moved relative to stationary cutting tool 50 and produces a cut design, such as cut design 42 of FIG. 2 according to a design appearing on surface 64 of paper platten 57.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A system for guiding a cutting tool including a cutting part for removing portions of a work piece, comprising;
   a. means for generating a beam of electromagnetic radiation;
   b. a platten having a portion with a surface capable of presenting a pattern, said beam impinging on said platten portion surface and being discernable thereupon; and
   c. alignment means for positioning said beam relative to the cutting part of the cutting tool to effect removal of material from the work piece according to said discernable beam following said pattern on said surface of said platten portion.

2. The system of claim 1 in which said means for generating a beam said member for generating a beam is fixed to the cutting tool.

3. The system of claim 2 in which the cutting tool includes an axis of orientation and said alignment means comprises mounting means for axially aligning said beam with the axis of the cutting part of the cutting tool.

4. The system of claim 1 in which said means for generating a beam of electromagnetic radiation is fixed relative to said platten.

5. The system of claim 4 in which the cutting tool includes an axis of orientation and said alignment means comprises mounting means for axially aligning said beam with the axis of the cutting part of the cutting tool.

6. The system of claim 1 in which said means for generating a beam comprises means for generating a laser beam.

7. The system of claim 6 in which said means for generating a beam said member for generating a beam is fixed to the cutting tool.

8. The system of claim 7 in which the cutting tool includes an axis of orientation and said alignment means for axially aligning said beam with the axis of the cutting part of the cutting tool.

9. The system of claim 6 in which said means for generating a beam is fixed relative to said platten.

10. The system of claim 9 in which the cutting tool includes an axis of orientation and said alignment means for axially aligning said beam with the axis of the cutting part of the cutting tool.

11. The system of claim 2 in which said platten is translucent.

12. The system of claim 4 in which said platten is opaque.

* * * * *